United States Patent
Yan et al.

(10) Patent No.: US 10,691,652 B2
(45) Date of Patent: Jun. 23, 2020

(54) SIMILARITY-BASED CLUSTERING SEARCH ENGINE

(71) Applicant: International Business Machines Corporation, Armonk, NY (US)

(72) Inventors: Wei Yan, Ningbo (CN); Jie Wang, Ningbo (CN); Jian Hui Chen, Ningbo (CN); Yu Zhu Xu, Ningbo (CN); Xiao Bo Ren, Ningbo (CN); Jian Lu, Ningbo (CN)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 15/939,393

(22) Filed: Mar. 29, 2018

(65) Prior Publication Data
US 2019/0303459 A1 Oct. 3, 2019

(51) Int. Cl.
*G06F 17/00* (2019.01)
*G06F 16/21* (2019.01)
*G06F 16/28* (2019.01)
*G06F 16/951* (2019.01)
*G06F 16/2457* (2019.01)

(52) U.S. Cl.
CPC ...... *G06F 16/212* (2019.01); *G06F 16/24578* (2019.01); *G06F 16/285* (2019.01); *G06F 16/951* (2019.01)

(58) Field of Classification Search
CPC ............. G06F 16/212; G06F 16/24578; G06F 16/951; G06F 16/285; G06F 16/35; G06F 16/953
See application file for complete search history.

(56) References Cited

U.S. PATENT DOCUMENTS 7,249,135 B2 7/2007 Ma et al.
7,636,713 B2 * 12/2009 Jadhav ................. G06F 16/287
(Continued)

FOREIGN PATENT DOCUMENTS

CA 2602642 3/2006

OTHER PUBLICATIONS

Alsayed Algergawy et al., A Schema Matching-Based Approach to XML Schema Clustering, iiWAS'08: Proceedings of the 10th International Conference on Information Integration and Web-Based Applications & Services, pp. 131-136, (https://doi.org/10.1145/1497308.1497337), Nov. (Year: 2008).*

(Continued)

*Primary Examiner* — Greta L Robinson
(74) *Attorney, Agent, or Firm* — Schmeiser, Olsen & Watts; Mark C. Vallone

(57) ABSTRACT

A search engine identifies external data records that describe similar entities and may each conform to a different data format or source schema. The engine derives mappings capable of translating data values between differently formatted attributes of two source schemas and uses these mappings to identify degrees of similarity between attributes and schemas. When the search engine receives a search request, the engine translates submitted search criteria into values of a first schema's attributes and then uses the mappings to map those values onto selected attributes of other schemas. The search engine then uses each schema's selected attributes to select external data records formatted in that schema. Each selected record is assigned a match score that is weighted by the similarity of the record schema's selected attributes to the search criteria. Records are then retrieved in order of decreasing match score.

20 Claims, 3 Drawing Sheets

(56) References Cited

U.S. PATENT DOCUMENTS

| | | | |
|---|---|---|---|
| 8,195,693 B2 | 6/2012 | Syeda-Mahmood | |
| 8,219,596 B2* | 7/2012 | Peukert | G06F 16/367 707/808 |
| 9,069,858 B1* | 6/2015 | Talmor | G06F 16/9535 |
| 2011/0219044 A1* | 9/2011 | Peukert | G06F 16/367 707/805 |
| 2017/0124217 A1 | 5/2017 | Hassanzadeh et al. | |

OTHER PUBLICATIONS

T. Syeda-Mahmood Gauri Shah, et al., Semantic Search of Schema Repositories, Retrieved on Jul. 27, 2017, Retrieved from Internet: https://www.researchgate.net/publication/221024022_Semantic_search_of_schema_repositories; Conference Paper—Jan. 2005 with 9 Reads, DOI: 10.1145/1062745.1062901—Source: DBLP, Conference: Proceedings of the 14th international conference on World Wide Web, WWW 2005, Chiba, Japan, May 10-14, 2005—Special interest tracks and posters, 8 pages.

Efficient Similarity Join and Search on Multi-Attribute Data, Published in:—Proceeding SIGMOD '15 Proceedings of the 2015 ACM SIGMOD International Conference on Management of Data, pp. 1137-115, Melbourne, Victoria, Australia—May 31-Jun. 4, 2015, ACM New York, NY, USA © 2015 table of contents ISBN: 978-1-4503-2758-9 doi>10.1145/2723372.2723733Retrieved on Jul. 27, 2017, Retrieved from Internet: http://dl.acm.org/citation.cfm?id=2723733, 2 pages.

\* cited by examiner

SIMILARITY-BASED CLUSTERING SEARCH ENGINE

BACKGROUND

The present invention relates to search engines in general and in particular improving the efficiency of known search-engine technology by allowing search engines to more efficiently and accurately organize heterogeneous data into clusters of similar information.

Search engines must search through enormous amounts of extrinsic data and return results quickly enough to provide the real-time response time required by interactive user interfaces. One way in which a search algorithm may speed up this process is by organizing searchable data items into clusters before starting a search, where each cluster contains items that have similar attributes. This step may reduce the number of data items that a search engine must consider when responding to a search request. For example, it is easier for a search engine to respond a search request related to computer monitors if responding requires the engine need search through only a single cluster that contains monitor specifications previously retrieved from Web sites of monitor manufacturers.

Clustering technology, however, introduces another set of problems. Organizing data into clusters of similar records requires an engine to process an enormous amount of third-party information. Each information source may use a proprietary or source-specific schema to format and organize data. Inconsistencies among these source schema make it harder for a search engine to compare records retrieved from different sources and to accurately determine whether entities described by different records have similar attributes.

Current search-engine technology addresses these problems by formatting all data items stored in a single cluster according to a common, cluster-specific objective schema. Importing data into such a cluster, however, requires a search engine to translate each imported data item from the data item's original source-schema format into the cluster's objective schema format. This translation comprises mapping each relevant attribute of an imported data item onto one or more attributes of the objective-schema format. This mapping must follow a distinct set of rules that is a function of both the source schema of the data item (which depends on the source from which the data items is retrieved) and the objective schema of the cluster in which the data item will be stored.

Known search engines have no way to automatically identify mapping rules capable of accurately and reliably correlating attributes of imported data records (which are based on source schemas), to corresponding attributes of a cluster's objective schema. This procedure can be especially difficult when the search engine imports data from many sources that each use a different schema to format and store data. Two imported records retrieved from databases comprising heterogeneous schemas, may thus represent identical semantic values in completely different ways. For example, a monitor's 24-bit color-depth attribute may be represented in one schema as a "true color" string, in a second schema as a "24" 16-bit integer value, and in a third schema as a "16.777216E+6" floating-point value.

Determining which data items are similar enough to be clustered together thus requires determining how to interpret attributes of those data items defined by various source schemas, and to then accurately map attributes from each source schema onto attributes defined by a cluster's objective schema. Current clustering methods perform this task, if at all, through a cumbersome brute-force method that loses the original source schemas after performing the mapping and that requires a search engine to derive new mapping rules every time data is discovered at a new data source that uses a previously unknown source schema.

Clustering search engines, therefore, although potentially more efficient than search engines that do not incorporate clustering technology, suffer from technical problems of their own that affect their efficiency and accuracy.

SUMMARY

An embodiment of the present invention is a computerized search-engine system that includes a processor, a memory coupled to the processor, and a computer-readable hardware storage device coupled to the processor. The storage device contains program code configured to be run by the processor via the memory to perform a method for a search engine with automated similarity-based clustering, the method comprising:

the search engine retrieving a plurality of records from one or more external sources, where each record of the plurality of records stores data in one or more attribute fields, and where each record's attribute fields are specified by a corresponding schema of a set of source schemas;

the search engine deriving a matrix of attribute mappings, where each mapping of the matrix identifies rules for translating a value of an attribute of a first schema of the set of source schemas into a value of an attribute of a distinct second schema of the set of source schemas, and where each mapping of the matrix is associated with a corresponding similarity score that identifies a relative degree of similarity between attributes mapped by the each mapping;

the search engine receiving a search request;

the search engine inferring, from the search request, values of a primary subset of attributes of the first schema;

the search engine using at least one of the matrix of attribute mappings to translate the values of the primary subset into values of a secondary subset of attributes of the second schema;

the search engine selecting a results subset of the plurality of records, where each record of the results subset is formatted in accordance with the second schema, and where each record of the results subset is selected with search criteria consisting of the values of the secondary subset of attributes; and the search engine returning the results subset in response to the search request.

Another embodiment of the present invention is a method for a search engine with automated similarity-based clustering, the method comprising:

retrieving, by the search engine, a plurality of records from one or more external sources, where each record of the plurality of records stores data in one or more attribute fields, and where each record's attribute fields are specified by a corresponding schema of a set of source schemas;

the search engine deriving a matrix of attribute mappings, where each mapping of the matrix identifies rules for translating a value of an attribute of a first schema of the set of source schemas into a value of an attribute of a distinct second schema of the set of source schemas, and where each mapping of the matrix is associated with a corresponding similarity score that identifies a relative degree of similarity between attributes mapped by the each mapping;

receiving, by the search engine, a search request;

inferring from the search request, by the search engine, values of a primary subset of attributes of the first schema;

using, by the search engine, at least one of the matrix of attribute mappings to translate the values of the primary subset into values of a secondary subset of attributes of the second schema;

the search engine selecting a results subset of the plurality of records, where each record of the results subset is formatted in accordance with the second schema, and where each record of the results subset is selected with search criteria consisting of the values of the secondary subset of attributes; and returning, by the search engine, the results subset in response to the search request.

Yet another embodiment of the present invention is a computer program product including a computer-readable storage medium storing computer-readable program code that is compatible with computerized search-engine system that includes a processor, a memory coupled to the processor, and a computer-readable hardware storage device coupled to the processor. The stored program code is configured to be run by the processor via the memory to perform a method for a search engine with automated similarity-based clustering, the method comprising:

the search engine retrieving a plurality of records from one or more external sources, where each record of the plurality of records stores data in one or more attribute fields, and where each record's attribute fields are specified by a corresponding schema of a set of source schemas;

the search engine deriving a matrix of attribute mappings, where each mapping of the matrix identifies rules for translating a value of an attribute of a first schema of the set of source schemas into a value of an attribute of a distinct second schema of the set of source schemas, and where each mapping of the matrix is associated with a corresponding similarity score that identifies a relative degree of similarity between attributes mapped by the each mapping;

the search engine receiving a search request;

the search engine inferring, from the search request, values of a primary subset of attributes of the first schema;

the search engine using at least one of the matrix of attribute mappings to translate the values of the primary subset into values of a secondary subset of attributes of the second schema;

the search engine selecting a results subset of the plurality of records, where each record of the results subset is formatted in accordance with the second schema, and where each record of the results subset is selected with search criteria consisting of the values of the secondary subset of attributes; and the search engine returning the results subset in response to the search request.

DETAILED DESCRIPTION

Figure 1:
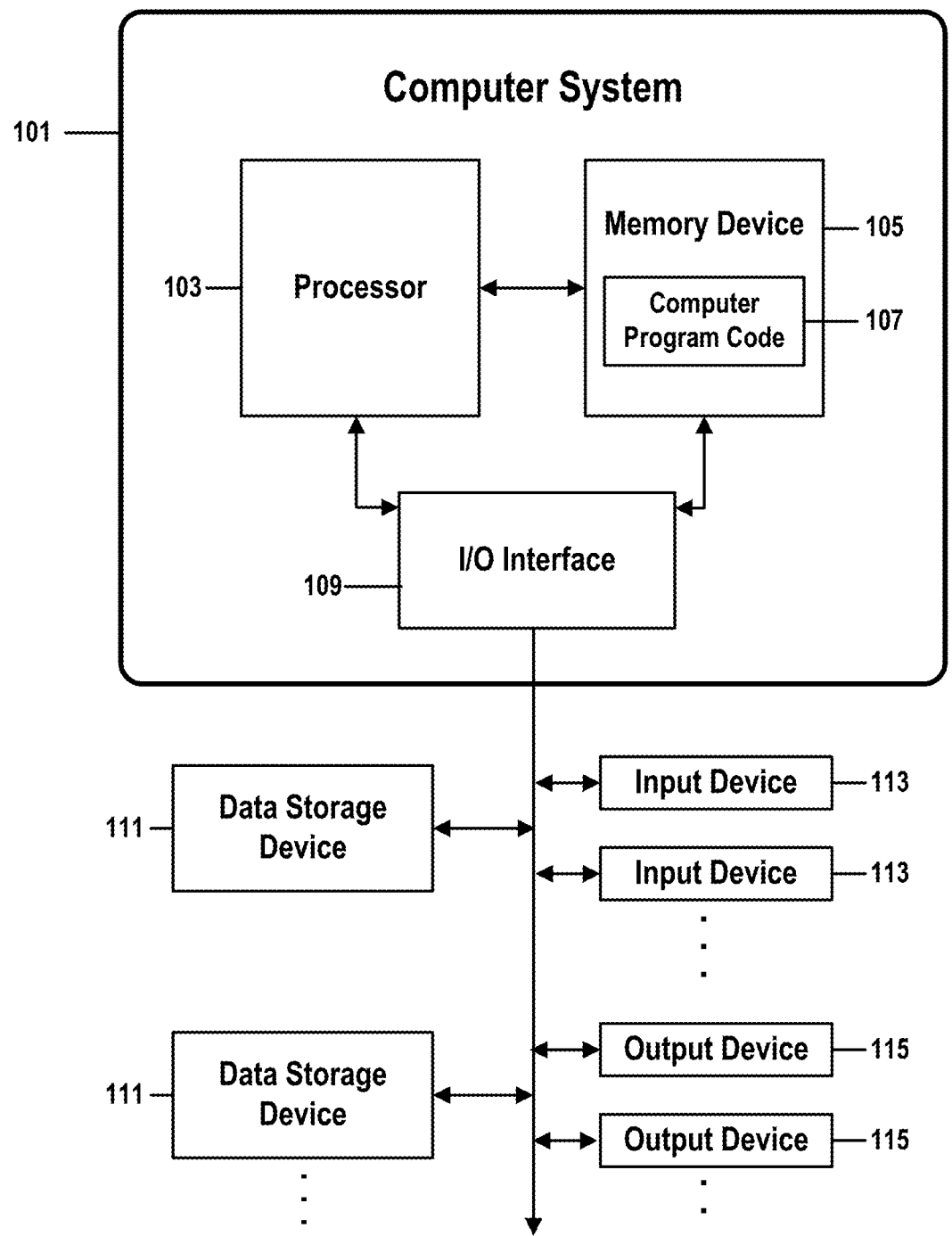
FIG. 1 shows the structure of a computer system and computer program code that may be used to implement a method for a search engine with automated similarity-based clustering in accordance with embodiments of the present invention.

Embodiments of the present invention provide a technical solution that improves the operation of computerized search engines that comprise clustering technologies. This technical solution solves a technical problem that arises from this technology, and that did not exist prior to the creation of this computerized technology.

One technical problem that arose with search-engine technology is the difficulty of upscaling a search engine to manage very large datasets without sacrificing the real-time interactivity required by the World Wide Web and other systems that incorporate graphical user interfaces. Unlike many computerized processes real-time performance is an essential element of interactive search engines and is not merely a feature of computerization that allows a non-computerized activity to be performed more quickly or more efficiently. Without this real-time performance, a search engine would be inoperable and the requirement for real-time, interactive response is one that arose with search engines and that is inherent in interactive search engine systems.

Although clustering technology has been used to improve the performance of some computerized search engines, clustering itself can introduce bottlenecks that limit the scalability of a search engine. For example, organizing enormous numbers of data items into clusters as a function of similarities among the data items, or among entities described by the data items, requires a way to identify similarities among data items. But when data items are retrieved from extrinsic sources that store the data items in heterogeneous formats, data structures, or schemas, the search engine may not be able to identify common parameters or attributes that allow the engine to directly compare data items.

This is a known problem that is even more significant when a search engine attempts to incorporate clustering technology into its search algorithm. This problem is especially burdensome for search engines that must search the Internet and larger intranets, enterprise networks, and cloud-computing environments, where a domain of candidate search results may contain documents or other items stored in formats conforming to grossly different, incompatible schemas.

In one example, consider a search domain comprising databases and other data repositories that each store information describing computer printers. These repositories may use hundreds of different, often inconsistent, attributes or parameters to describe characteristics of each printer. A clustering search engine, in order to more efficiently respond to a printer-related query, may have tried to organize printer-related data items retrieved from those repositories into clusters, such that each cluster contains search criteria likely to return results comprising data items that describe similar printer-related entities.

Determining which data items are similar, however, requires a way to infer those similarities from values of numerous, inconsistent, or redundant, attributes comprised by the various source-repository schemas. Clustering search engines attempt to simplify this task by translating each retrieved data item into a format defined by a single, common "objective" schema. In this way, every data item in a cluster may be assumed to describe a printer entity in a consistent manner.

For example, the various repository schemas might in aggregate comprise several dozen differently named attribute parameters to describe the maximum number of colors a printer can print, such as "# of Colors," "Color," "Colors," "Bit depth," "Maximum # Colors," "color depth," "Color resolution," "8/16/24/32," and "B&W/Color." These parameters may each use different values, scales, units, symbols, strings, or other types of token to represent a number of colors. Determining whether any of these parameters describe similar or analogous attributes and then identifying how to reconcile the stored values of these parameters into a common objective-schema format would allow a search engine to more efficiently use the resulting objective attributes to select similar data items. The data items could then more quickly be sorted into more easily searched clusters of similar items.

The incorporation of objective-schema-based clustering technology into search engines thus introduces yet another technical problem: a need for a way to determine how to correlate and translate attributes used by different schemas. For example, determining that an objective schema's "color depth" has greater similarity to a first source-schema's "8/16/24/32" attribute than it does to the source schema's "paper size" attribute would let a search engine determine that it should attempt to import "8/16/24/32" values, rather than "paper size" values, into the objective schema's "color depth" attribute.

Search engines based on objective-schema-based clustering technology also suffer from several other inherent problems that arise from the existence of this type of clustering technology. Because of the enormous number of records retrieved by search engines, translating every retrieved record into an objective-schema format requires an enormous amount of system resources that can make real-time performance impossible. Even when the brunt of this translation effort is performed prior to using a cluster to respond to a search request, the dynamic nature of the Internet requires continuous translations to occur whenever extrinsic data is updated.

Another problem solved by embodiments of the present invention is that translating a retrieved record into an objective schema format irreversibly loses information comprised by the record's original source schema. This too is a technical problem that arose from clustering search engine technology.

Finally, every time a known clustering search engine retrieves a data record in a previously unknown format or schema, the engine must determine how to translate that new format or schema into its objective schema. This may result in the need to redefine the objective schema, which in turn can require the search engine to translate every previously formatted data item in a cluster into the modified objective schema format.

Embodiments of the present invention provide a technical solution to these problems that improves the operation of computerized search engines that incorporate clustering technology. This technical solution solves a technical problem that arose from this technology, and that did not exist prior to the creation of this computerized technology.

This technical solution comprises methods and systems for:

i) identifying similarities among attributes or fields of heterogeneous source schemas used to generate mappings that allow attributes of one source schema to be translated to attributes of other source schemas;

ii) using these mappings to quantify a degree of similarity between the attributes of each mapping;

iii) responding to a search request by selecting attributes of each source schema that are most similar to attributes specified by the search criteria;

iv) using the mappings to translate the search criteria into each source schema's selected attributes;

v) using each schema's translated search criteria to select from a cluster data records that conform to the schema and that satisfy the translated search criteria; and vi) adjusting each selected record's match score as a function of the similarity of the record's selected search attributes to the original search criteria.

These systems and methods do not require data records to be translated from their source schema format, and thus cannot lose information intrinsic in a source schema. Furthermore, the attribute mappings derived by embodiments of the present invention are not affected when a previously unknown format or schema is encountered. Instead, embodiments of the present invention merely generate new mappings, using the same procedure, without requiring modification or updating to any of the existing mappings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for a search engine with automated similarity-based clustering in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for a search engine with automated similarity-based clustering in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for a search engine with automated similarity-based clustering.

Any of the components of the present invention could be created, integrated, hosted, maintained, deployed, managed, serviced, supported, etc. by a service provider who offers to facilitate a method for a search engine with automated similarity-based clustering. Thus the present invention discloses a process for deploying or integrating computing infrastructure, comprising integrating computer-readable code into the computer system 101, wherein the code in combination with the computer system 101 is capable of performing a method for a search engine with automated similarity-based clustering.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 107 for a method for a search engine with automated similarity-based clustering may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for a search engine with automated similarity-based clustering is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
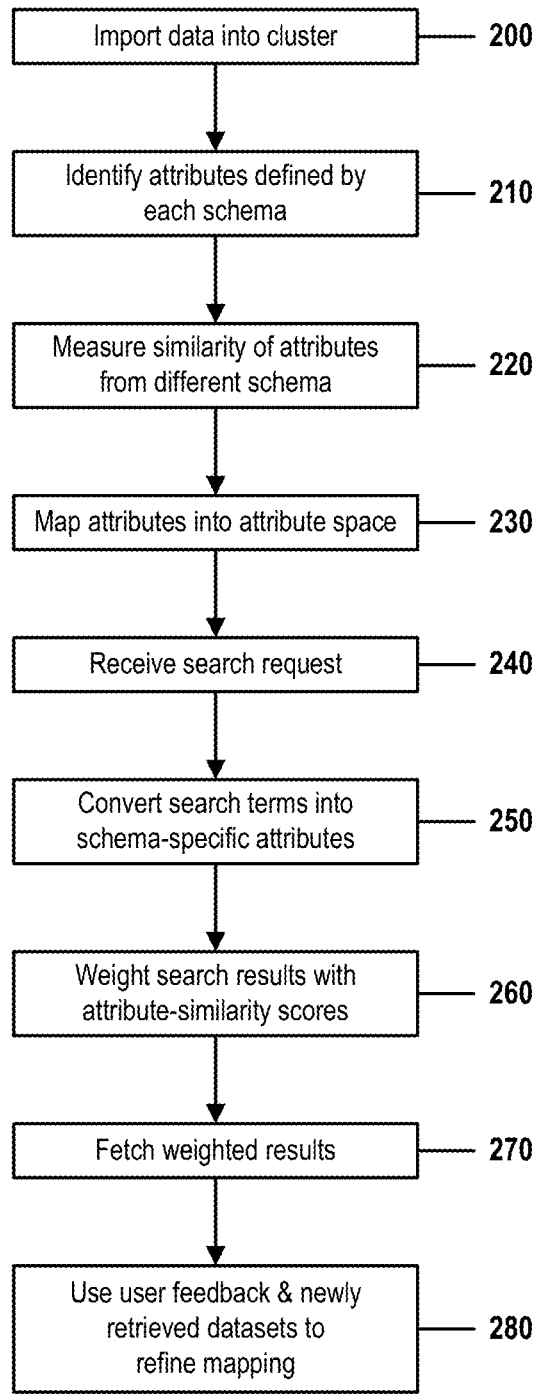
FIG. 2 is a flow chart that illustrates the steps performed by a similarity-based clustering search engine, in accordance with embodiments of the present invention.

FIG. 2 is a flow chart that illustrates steps performed by a search engine with automated similarity-based clustering, in accordance with embodiments of the present invention. FIG. 2 shows elements identified by reference numbers 200-280.

In step 200, a processor of a computerized search engine retrieves, from a variety of external data sources, data items that the search engine may be required to search through in response to a search request. This retrieval may be performed by any means known in the art for searching through Internet Web sites or through other data repositories and then identifying and downloading data stored at those repositories.

The search engine may then organize the retrieved data into one or more local data repositories known as clusters, where each cluster may contain data elements that are presumed to describe a similar type of entity. For example, one cluster may contain data records that describe characteristics of computer monitors, and a second cluster may contain data records related to computer printers.

Data retrieved from any one of these external sources may be retrieved in a structure or format defined by that source's specific schema. Each source-specific schema defines a method of representing stored data, or attributes of stored data, in a particular format, or structured according to certain record or field data structures, and certain relationships among records and fields. A pair of data sources may thus represent a same element of information in different ways or may use different attributes to describe the same element of information. A cluster may therefore contain data elements or records that were originally retrieved in different formats or that are characterized by different sets of attributes.

Consider, for example, two Web-site sources that each comprise a database maintained by a different reseller of computer printers. These databases contain records that each describes one printer model. But records in the first database may conform to a schema in which each record comprises the fields "Color," "Printing Technology," "PC Connection," and "Item Weight," and where each of these fields describes one printer attribute. The second database, however, may conform to a schema that defines records that use differently named fields to describe identical attributes: "Product Color," "Printer Technology," "Computer Interface," and "Weight." Furthermore, the first database's "Item Weight" attribute may describe a printer's shipping weight in units of grams or kilograms, while the second database's "Weight" attribute may describe an unpacked printer's weight in units of pounds and ounces. In such a case, search engines known in the art may not be able to directly compare the relative weight of a printer described by the first source with a printer described by the second source. These inconsistent attributes would make it difficult to compare records in the two databases when attempting to identify printers that have similar weights.

In step 210, the processor identifies and enumerates the attributes defined by each schema of an extrinsic source from which data was retrieved and imported in step 200. This step may be performed by any means known in the art, such as by simple pattern-matching or string-matching, by a cognitive method, or by referring to information stored in reference materials. In cases where each extrinsic source comprises a well-defined schema, this step may be performed by simply retrieving or inferring field names, key names, or record names from the schema.

Figure 3:
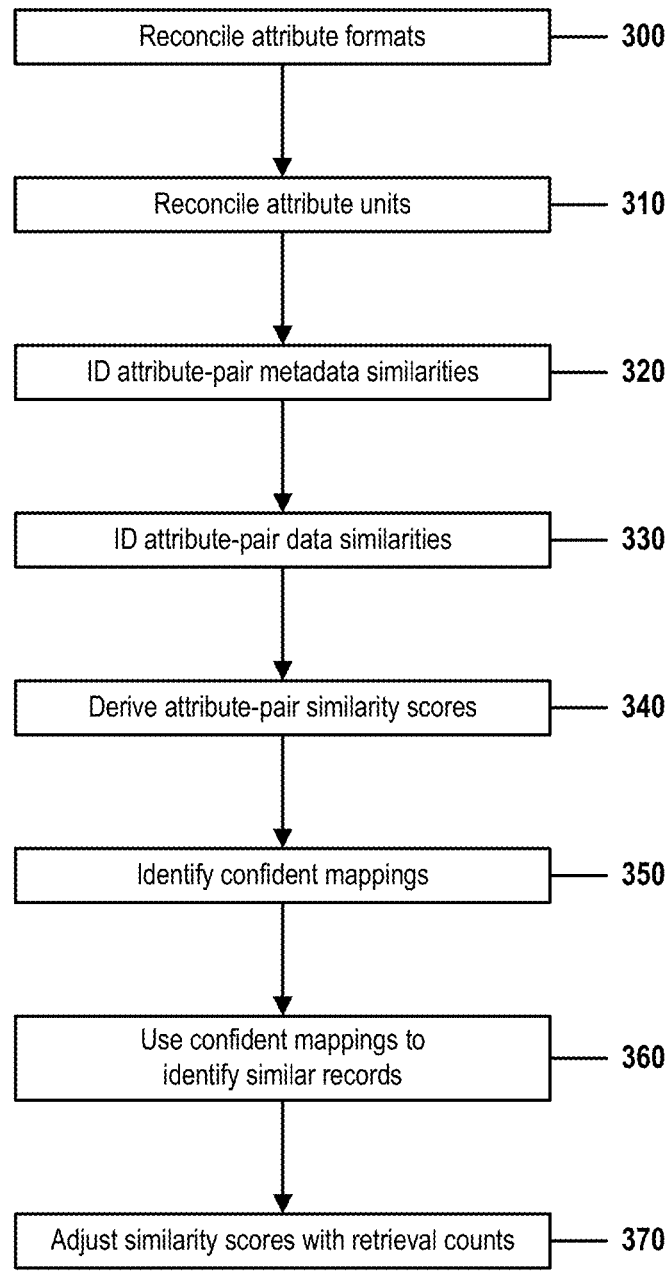
FIG. 3 is a flow chart that illustrates steps for measuring similarity of attributes from different schema, in accordance with embodiments of the present invention.

In step 220, the processor the relative similarity of each attribute of each source schema to attributes of other source schemas. FIG. 3 describes in greater detail methods by which step 220 performs this task.

Here, a first attribute of a first schema is considered to be more similar to a second attribute of a second schema if a greater similarity between a value of the first attribute in a first data record and a value of the second attribute in a second record indicates a greater likelihood that the two records identify similar information.

For example, a first database may contain records that each describe a product with a "Item Weight" attribute, a second database may contain records that each describe a product with a "Product Weight" attribute, and a third database may contain records that each describe a product with a "Year of Introduction" attribute. The system in step 220 might then determine that if a record of the first database comprises an Item Weight value of 1972 and a record of the second database comprises a Product Weight value of 1972, then this is more likely to indicate that the two records describe similar products (both of which weight 1972 grams). However, if the system determines that a record of the third database comprising a Year of Introduction value of 1972 is less likely to describe a product similar to that described by either of the other two records, the system would then conclude that the Item Weight and Product Weight attributes are more similar to each other than either of those attributes are to the Year of Introduction attribute. The search engine would then assign a higher similarity score to the (Item Weight, Product Weight) attribute pair than would be assigned to either the (Item Weight, Year of Introduction) pair or the (Product Weight, Year of Introduction) pair.

In step 230, the processor optionally maps the attribute score of each attribute pair into a two-dimensional "attribute-similarity space," where a greater similarity score of a particular pair of attributes indicates that the pair of attributes have greater similarity.

This mapping, and the similarity scores derived in step 220, may be used to generate attributes of each cluster's objective schema, where the generated attributes are selected as functions of the most similar pairs of attributes. The generation of an objective schema is not, however, an essential component of all embodiments of the present invention.

At the conclusion of step 230, the system will have identified the degree of similarity between each pair of attributes (Ai,Bj) of each pair of source schemas, and will have expressed such a similarity score as a numeric value SS(Ai,Bj). These scores will allow the search engine to efficiently search through clusters of retrieved data items.

In step 240, the search engine receives from a user a search request, where the search request comprises one or more search criteria, such as textual search terms. In some embodiments, step 240 may occur at a different point in the method of FIG. 2. For example, the receipt of a search request may satisfy a condition that then triggers one or more of steps 200-230.

In step 250, the search engine converts the search criteria received in step 240 into the format of one or more of the source-schema attributes derived in step 210.

This conversion may comprise first converting the search criteria into standard "key-operator-value" (KOV) format by means known in the art. For example, if a user enters search criteria "24-bit color printer," a search engine might translate the criteria into two key-operator-value conditions:

i) device=printer
    (key="device," operator="=", value="printer")
  ii) colordepth=24-bit
    (key="colordepth," operator="=", value="24-bit").

In embodiments of the present invention, the search engine uses known methods to translate search criteria into KOV format comprising keys similar to or identical to attributes derived in step 210. Just as known objective-schema-based clustering search engines might convert search terms into KOV format in order to search through keys of an objective schema, embodiments of the present invention would use the KOV-formatted terms derived in this step to retrieve a record based on an exact match of a schema attribute to a derived key of a KOV-formatted search term.

For example, the search engine might have translated the above criteria into key-operator-value conditions comprising "device" and "colordepth" keys because the processor had in step 210 identified a "device" attribute and a "colordepth" attribute in a first schema of the source schemas imported in step 200. This translation would have provided an exact attribute match, allowing the search engine to accurately search through records formatted according to the first schema, without requiring those records to have been translated into an objective schema.

This is an improvement over the operation of a conventional non-clustering search engine, which would not have been able to as efficiently search through records retrieved in formats other than that of the first schema. And even known clustering search engines would have required both translating the entered search terms into a KOV format comprising objective-schema attributes and reformatting all retrieved records into the objective schema.

In step 260, the search engine uses the SS similarity scores derived in step 220 and FIG. 3 to select mappings that allow the search engine to search records that conform to other source schema.

For example, Table 1 shows an exemplary similarity matrix for a 6-attribute schema 1 and a 5-attribute schema 2.

TABLE 1

|     | 2-1 | 2-2 | 2-3 | 2-4 | 2-5 |
| --- | --- | --- | --- | --- | --- |
| 1-1 | .2  | .4  | .1  | .3  | .1  |
| 1-2 | .35 | .6  | .64 | 0   | .4  |
| 1-3 | .02 | .9  | .02 | .02 | .02 |
| 1-4 | .76 | 0   | .5  | 0   | .42 |
| 1-5 | .65 | .1  | .8  | .21 | .04 |
| 1-6 | .01 | .02 | .04 | .045| .02 |

In this example, the search engine has translated user-entered search criteria into KOV-formatted conditions that specify values of two attributes of schema 1:

Attribute 1-3="JK-2018"
Attribute 1-5="10 cm"

In this step, the search engine would then use this table to identify similar attributes of schema 2 that would allow the search engine to search for the entered criteria through records formatted in conformance with schema 2. Unlike conventional search engines, this search could be completed without requiring that the schema 2 records be reformatted to a common objective schema.

The search engine would perform this search through the schema 2 records by selecting attributes of schema 2 that have highest respective similarities to the schema 1 attributes identified by the KOV conditions. In this example, schema 2 attribute 2-2 has the greatest similarity to schema 1 attribute 1-3 (SS=0.9) and schema attribute 2-3 has the greatest similarity to schema 1 attribute 1-5 (SS=0.8).

The search engine would then refer to the mappings developed in steps 200-220 to perform any necessary data conversions on the search criteria that will be used to search the schema 2 records. In this example, the mapping between attributes 1-3 and 2-2 is an equivalence, but the mapping between attributes 1-5 and 2-3 comprises a units conversion from centimeters to millimeters.

The present invention is flexible enough to comprise other methods of selecting mappings from each matrix, if desired by an implementer. For example, instead of selecting the schema 2 attribute that has the greatest similarity to a schema 1 attribute, a search engine may select a schema 2 attribute that, although not the most similar, was selected as a confident mapping of the schema 1/schema 2 matrix in step 350. In cases where a single schema 1 attribute is capable of comprising more than one schema 2 attribute, the search engine may select a subset of the schema 2 attributes that in aggregate, provide a highest average similarity score. In yet other embodiments, a schema 2 attribute may be selected only if its similarity score to a corresponding schema 1 attribute exceeds a predetermined threshold value.

The search engine would thus search through schema 2-formatted records in the cluster with the search criteria:

Attribute 2-2="JK-2018"
Attribute 2-3="100 mm"

These search terms may be translated in a similar way to comprise the most similar attributes for every other schema used by the cluster data items. Each set of search criteria derived in this way will reference attributes by comparing similarity scores of each matrix.

In step 270, the search engine selects result records from each set of data records in the cluster. The engine uses the set of search attributes derived in step 260 for each source schema in order to select records formatted in accordance with that source schema. For example, the engine searches for records formatted in accordance with schema 1 with the search terms "Attribute 1-3='JK-2018'" and "Attribute 1-5='10 cm'" and searches for records formatted in accordance with schema 2 with the search terms "Attribute 2-2='JK-2018'" and "Attribute 2-3='100 mm'".

Using methods known in the art, the search engine will assign each selected result record a match score that identifies how closely the selected record satisfies the search criteria. Embodiments of the present invention will then adjust each match score by weighting each selected record's score with a composite similarity score of the attributes that were used to select that record.

For example, three schema 2 record selected by the attribute 2-2 and 2-3 search criteria in the above example might have match scores:

TABLE 2

| Retrieved record | Match Score |
| --- | --- |
| S2 record 1 | .75 |
| S2 record 2 | 1.0 |
| S2 record 3 | .5  |

Here, the schema 2 search is deemed to have an aggregate condition-similarity weighting equal to the average of the schema 1/schema 2 mapping of each schema 2 attribute comprised by the search criteria. In this case, SS(1-3,2-2)=0.9 and SS(1-5,2-3)=0.8, resulting in a weighting equal to (0.9+0.8)/2=0.85. In other embodiments, other known methods of deriving a weighting may be used, such as by setting a weighting equal to the similarity score of the corresponding confident mapping or by using a highest, lowest, or average score of an entire matrix.

The search engine then adjusts each selected record's match score by the aggregate weighting derived for the mappings used to perform the search. In the running example, schema 2 records selected using search criteria based on attributes 2-2 and 2-3 would thus be assigned weighted match scores shown in Table 3.

TABLE 3

| Retrieved record | Match Score | Weighting | Adjusted Match Score |
| --- | --- | --- | --- |
| S2 record 1 | .75 | 0.85 | 0.6375 |
| S2 record 2 | 1.0 | 0.85 | 0.8500 |
| S2 record 3 | .5 | 0.85 | 0.4250 |

The match scores of selected data records that comply with other source schema are adjusted in a similar way. For example, if two schema 1/schema 4 mappings have an aggregate similarity score=0.7, then match scores of schema 4 records selected by search criteria generated by those mappings would each be weighted by the value 0.7.

In a case in which two schemas are determined to be identical, a mapping will have a weighting equal to one. Match scores associated with schema attributes to which the search criteria were originally translated would thus not be modified by a weighting. In the running example, any records retrieved by the pair of schema 1 attributes (1-3) and (1-5) would thus not be adjusted because those attributes would be associated with a weighting of 1—an exact match to the original KOV-formatted search criteria.

In step 270, the search engine sorts all records selected in step 260, regardless of those records' schemas, by the records' adjusted match scores. The engine then fetches the records and displays them to the user in a normal manner, in descending order of adjusted match score.

In step 280, the system optionally adjusts similarity scores as a function of the user's actions in response to viewing the selected records. This adjustment may be configured by any means desired by an implementer. For example, if the user selects a displayed record, the similarity scores of mappings that generated the search criteria used to select that record may be incremented by a fixed amount or by a percent of the current similarity scores. In other implementations, the mappings may be implemented only if the user selects a certain number of records selected by the same mappings or if a certain percent of the records selected by the user have been selected by the same mappings.

The method of FIGS. 2 and 3 may be repeated in this manner, with steps 240-280 being repeated each time a set of search criteria is received from a user, and steps 200-230 and 300-370 being performed each time new records are imported into a cluster.

FIG. 3 is a flow chart that illustrates steps for measuring similarity of attributes from different schema and mapping those attributes into a multidimensional attribute space, in accordance with embodiments of the present invention. FIG. 3 contains steps 300-370, which describe step 220 of FIG. 2 in greater detail.

At the outset of step 300, a search engine has retrieved data from a variety of external sources and stored the retrieved data into a cluster. Data in this cluster is assumed to be similar in certain ways that make searching through the cluster more efficient than searching at random through the Internet. For example, each data item in a cluster may describe a characteristic of a similar type of entity (such as 1967 record albums, a tsunami that occurred in Polynesia in 1946, or winter Olympics sporting events).

Each data item in the cluster is at this point formatted in accordance to a source schema specific to the external source from which the data item was retrieved. Depending on implementation details, these sources may comprise Internet Web pages, online data repositories, published databases, private or public libraries, and other types of information resources. Because each source schema may comprise inconsistent record or field formats, data items retrieved from different sources may be described by different attributes. For example, records retrieved from a first data source may represent a date attribute of a data record as a single field MMDDYY, but a second source may represent date attributes in DDMMYY, DDMMYYYY, MMYYYY, or textual formats, or may require three distinct Day, Month, and Year attribute fields to represent a date.

In step 300, an Attribute Analyzer component of the search engine begins the process of determining which data items and attributes of the data items have the greatest similarity by identifying attribute-to-attribute mappings that reconcile formats of each data item.

For example, if the cluster contains data items retrieved from 750 distinct sources, each of which has formatted data according to a unique source schema, the search engine will examine the format of each data item or attribute defined by each source schema, and will then derive a mapping that translates that format to a consistent, common format defined for all attributes of the cluster that store the same type of data.

In the preceding example, if the search engine had been configured to prefer a date format of DDMMYYYY, where this configuring may be performed by any means known in the art, including by means of a personal preference of a designer or by selecting a format that is most common or that is most similar to the search engine's internal formats.

The search engine would then in step 300 select mappings that each translates a date-related attribute comprised by a source schema from that schema's format into the common DDMMYYYY format.

This translation may be performed by any means known in the art, such as by a straightforward conversion of a textual month name to its two-digit numerical equivalent, or by translating, two-digit YY year fields to four-digit YYYY fields by adding a "19" or "20" prefix, depending on whether the imported two-digit field exceeds a certain value.

Similar procedures may be used to translate other types of imported data from a format conforming to a source schema, to the search engine's common format. For example, imported "Model Number"-type data item may be converted from a variety of different-length string or numeric values to a search engine's common 12-character alphanumeric string field.

In step 310, the search engine in a similar manner reconciles units of similar-type attributes comprised by different imported source schema. For example, attributes that specify linear dimensions of a product's packaging may express those measurements as feet and inches, as inches, as centimeters, or as millimeters. In this step, the search engine would translate the values stored in all such fields into a common unit.

As in step 300 this step may be performed by any means known in the art. For example, the search engine may identify which attributes are of a similar type as a function of each retrieved item's metadata, by means of cognitive analysis, by evaluating certain characteristics of a source, by referring to extrinsic documentation, or by other types of contextual considerations. Similarly, the search engine may select its preferred units by means known in the art, such as by arbitrarily selecting a designer's personal preference or by selecting a unit that is most commonly found among retrieved data items or that is most similar to units already used internally by other functions of the search engine.

In step 320, the search engine compares attribute fields of the imported data's source schemas in order to determine which pairs of attributes have greater similarity. In embodiments described in this document, the engine will compare every possible pair defined by each pair of imported source schemas, where no attribute pair consists of two attributes of the same source schema.

For example, records imported from a first source may conform to a first source schema that characterizes each imported record with "Retail Price" and "Product Weight" attribute/metadata fields; and records imported from a second source may conform to a second source schema that characterizes each imported data item with "Selling Price" and "Buyer Rating" attribute/metadata fields. The search engine in this step would attempt to determine which attributes defined by the first source schema are most similar to each attribute defined by the second source schema—a step that would comprise four comparisons of four possible pairs.

Embodiments of the present invention are flexible enough to perform this step by any means known in the art or desired by an implementer. In embodiments described here, a search engine may, for example, use known methods of fuzzy logic or text analytics to assign a relative attribute-name similarity score $x_1$ between 0 and 1, inclusive, to the two attribute names of each pair of attributes. In such a case, a higher value may represent a greater degree of similarity between a pair of attribute names, with a value of 1 indicating an exact match.

For example, because the name of attribute "Retail Price" is more similar to the name of attribute "Selling Price" than it is similar to the name of attribute "Buyer Rating," the search engine would assign a greater $x_1$ value to the (Retail Price, Selling Price) attribute pair than to the (Retail Price, Buyer Rating) pair.

Although the exact numeric values of each $x_1$ value may be arbitrarily selected by an implementer, these values should consistently increase or decrease monotonically as a function of the relative similarity of two attribute names. A perfect match might, for example, be indicated by an $x_1$ value of one, and an $x_1$ value of zero might denote a pair of completely unrelated attribute names.

In a similar manner, the search engine might assign each attribute pair a relative attribute-type similarity score $x_2$ between 0 and 1, inclusive, to each pair of attributes. In such a case, a higher value may represent a greater degree of similarity between a pair of attribute types. For example, a "Length" attribute may have a greater degree of similarity with "Width," and "Depth" attributes than with a "Shipping Cost" attribute because "Length," "Width," and "Depth" attributes all share the same "product dimension specification" type.

The search engine would then aggregate each attribute pair's $x_1$ and $x_2$ scores by combining each score and normalizing the result to a value between 0 and 1, inclusive. This document will refer to this normalized value as an attribute pair's metadata similarity score X.

Embodiments of the present invention may accommodate performance of this aggregating and normalizing by means of any function $f_m$ desired by an implementer. In a simple example, $f_m$ may simply return an average of a pair of $x_1$ and $x_2$ values. In other examples, an implementer might choose to assign proportional weights to $x_1$ and $x_2$ values in order to better reflect the relative importance of the two values, prior to performing an averaging function.

This procedure might be summarized in Eq. (1) as:

$$X = f_m(x_1, x_2), X \in [0,1] \qquad (1)$$

In step 330, the search engine performs an analogous operation upon each attribute pair to create a set of data similarity scores Y. Embodiments of the present invention are flexible enough to perform this step by any means known in the art and desired by an implementer. In embodiments described here, a search engine may, for example, express a data similarity score Y of an attribute pair as a function $f_d$ of n component similarity scores $y_n$.

Examples of such data-similarity scores y might be determined by:

a function that identifies a relative similarity between numeric values of an attribute pair. These relative similarities may be identified through any means known in the art, such as by comparing absolute or normalized differences, distances along a parametric axis, or standard deviations from a mean or central value in a distribution derived by known a statistical distribution function. In one embodiment, a Chi-Square function might return a first relative similarity $y_1$ and a Kullback-Leibler (relative entropy) divergence function might return a second relative similarity $y_2$. In another example, two attributes may be deemed to be more similar if there is a greater overall similarity between statistical distributions (such as more similar mean and standard-deviation values) of all data values comprised by instances of the two attributes in the cluster.

a function that identifies a relative similarity between string values of an attribute pair. These relative similarities may be identified through any means known in the art, such as by deriving a TF-IDF (Term Frequency, Inverse Document Frequency) value for each string or word of a string, where a larger TF-IDF value indicates a word that has an unusually high frequency of occurrence. In some embodiments, only words of a text string that have a TF-IDF value greater than a certain predefined threshold value may be considered. A score $y_3$ may be arbitrarily assigned as a function of each pair's TF-IDF values, where a more similar pair of values results in a higher $y_3$ value, and where each $y_3$ value may be normalized into a range between 0 and 1, inclusive. In a simpler example, a $y_3$ score may simply identify a percent of the alphanumeric characters of the attribute two names that comprise by exactly matching substrings, or that comprise words that, through methods of semantic analysis, have synonymous meanings.

applications of other known similarity functions $y_4 \ldots y_n$ that each identify similarity between dataset distributions, where two attributes are deemed to be more similar if the distributions of values of the two attributes (in records stored in the same cluster) are more similar. Examples of such functions are: a Jaccard similarity coefficient calculation; a cosine similarity measurement; and an application of a Kullback-Leibler divergence function to relative distributions of string values of a cluster's instances of the attribute pair.

The search engine will then derive an overall data similarity score Y for each pair of attributes by aggregating the $y_n$ similarity values returned by numeric and string functions like those described above. As with the metadata-similarity derivation of Equation (1), this operation may also normalize each resulting similarity score Y to a value between 0 and 1, inclusive.

Embodiments of the present invention may perform these operations by means of any function $f_d$ desired by an implementer. In a simple example, $f_d$ may simply return an average of the y values. In other examples, an implementer might choose to weight each y value prior to averaging in order to better reflect the relative importance of each y value.

This operation may be represented by Equation (2):

$$Y=f_D(y_1,y_2,\ldots,y_n), Y\in[0,1] \quad (2)$$

In step 340, the search engine translates the metadata similarity score X and data similarity score Y of an attribute pair Ai of a source schema A and Bj of a source schema B into a single similarity score SS(Ai,Bj). This score will initially be adjusted by a weighting factor r that is computed for each pair of source schemas.

Computing a value of r for a pair of source schemas A and B begins by deriving the variance V(X) of the metadata-similarity scores X of all attribute pairs of the two schema. For example, if source schema A comprises 5 attributes {A1, A2, A3, A4, A5} and source schema B comprises 2 attributes {B1, B2}, V(X) for schemas A and B would be computed as the variance of the 10 metadata-similarity scores X derived in step 330 for the 10 possible pairs of schema A attributes with schema B attributes.

Next, the search engine similarly derives the variance V(Y) of the 10 data-similarity scores Y of the attribute pairs of the two schemas. V(X) thus represents the variance in the similarity between schema A metadata and schema B metadata; and V(Y) represents the variance in the similarity between schema A data values and schema B data values.

A smaller value of V(X) therefore means that the metadata of schema A and schema B have more consistent degrees of similarity and can be expected to contribute less to each similarity score of an attribute pair of schemas A and B than does the data similarity of that attribute pair. Conversely, a smaller value of V(Y) means that the data values of schema A and schema B have more consistent degrees of similarity and can be expected to contribute less to each similarity score of an attribute pair than will that pair's metadata similarity. Accordingly, the search engine derives a value of r that weighs each similarity score SS of each schema A/schema B attribute pair to reflect this relative importance of metadata similarity and data similarity to the two schemas as a whole.

This weighting factor r may be derived by Eq. (3):

$$r=V(Y)/[V(X)+V(Y)] \quad (3)$$

and the similarity score SS(Ai,Bj) of a pair of attributes (Ai,Bj), where Ax is an attribute of source schema A, By is an attribute of source schema B, the metadata-similarity score of the attribute pair is X(Ai,Bj), and the data-similarity score of the attribute pair is Y(Ai,Bj), can be derived by Eq. (4):

$$SS(Ai,Bj)=r*X(Ai,Bj)+(1-r)*Y(Ai,Bj) \quad (4)$$

The search engine repeats this procedure for each pair of source schemas and for each attribute pair of the source schemas. A unique value of r is derived for each pair of schemas and a unit value of SS is derived for each attribute pair. As shown in FIG. 4, each value of SS is derived as a function of the value of r associated with the two source schemas associated with the attribute pair of that value of SS.

At the conclusion of step 340, the search engine will have derived a Similarity Score SS for every attribute pair of every pair of source schemas.

At this point, it is possible to represent the overall similarity between a schema 1, which comprises n attributes {1-1, 1-2, . . . , 1-n} and a schema 2, which comprises m attributes {2-1, 2-2, . . . , 2-m} as an n×m Similarity Matrix like the matrix shown in Table 4. This table shows, for example, that attribute pair 1-2 of schema 1 and 2-2 of schema 2 have a similarity score SS(1-2,2-2)=0, indicating that attribute 1-2 has no similarity to attribute 2-2. In like manner, the table shows that attribute pair 1-4 of schema 1 and 2-1 of schema 2 have a similarity score SS(1-4,2-1)= 0.75, indicating that attribute 1-4 has a higher degree of similarity to attribute 2-1. A similar similarity matrix may be constructed for every pair of schemas that each define a format of a data item imported into the cluster in step 200.

TABLE 4

|     | 2-1 | 2-2 | 2-3 | 2-4 | 2-5 |     | 2-m |
| --- | --- | --- | --- | --- | --- | --- | --- |
| 1-1 | .2  | .9  | .1  | .3  | .1  |     | .02 |
| 1-2 | .95 | 0   | .94 | 0   | .4  |     | 0   |
| 1-3 | .02 | .02 | .02 | .02 | .02 | ... | .02 |
| 1-4 | .76 | 0   | .8  | 0   | .42 |     | 0   |
| 1-5 | .02 | .02 | .02 | .02 | .02 |     | .02 |
| 1-n | .02 | .02 | .02 | .02 | .02 | ... | .02 |

As will be discussed in the description of step 350, each entry in a similarity matrix identifies a similarity score of a mapping from an attribute of a first schema onto an attribute of a second schema. For example, in Table 4, the 0.2 value in the first data row identifies the similarity score of the mapping of attribute 1-1 of schema 1 onto attribute 2-1 of schema 2 (and vice-versa). This mapping may comprise translations performed in steps 300 and 310 and is characterized by a similarity score SS(1-1,2-1) that may comprise data and metadata similarity scores $x_n$ and $y_n$ generated in steps 320-340. This mapping's this relatively low 0.2 score indicates that the mapping between these two attributes is relative weak and that the two attributes have a low degree of similarity.

In step 350, the search engine identifies one or more confident mappings in each matrix of attribute similarity scores derived in step 340. A confident mapping of a similarity matrix for two schemas is the mapping that will be used in step 360 to identify similar records. For example, if a mapping of attribute 1-2 of schema 1 onto attribute 2-3 of schema 2 is identified as the confident mapping of the schema 1/schema 2 matrix, then the search engine will examine and compare values of attributes 1-2 and 2-3 when attempting to match imported records conforming to schema 1 with imported records conforming to schema 2 that identify similar objects.

Deriving a confident mapping involves selecting a threshold value T that identifies a minimum amount by which the similarity score of a confident mapping must exceed the similarity scores of all other mappings. This threshold value may be selected by any means known in the art. For example, an implementer may simply select an arbitrary value, such as 0.2, that represents a minimum difference in similarity scores that the implementer is willing to consider.

In other embodiments, the threshold T may be selected, for example, as a median or a mean of the set of all similarity scores derived in step 340, or of a subset of those similarity scores. Embodiments of the present invention may also comprise steps, such as step 280 of FIG. 2, that iteratively fine-tune a threshold value as a function of the results of a performance of the methods of FIGS. 2 and 3.

Mapping SS(1max,2max), where 1max is an attribute of schema A and 2max is an attribute of schema B, is the confident mapping between schemas A and B if that mapping satisfies the conditions:

(i) No similarity score of any other attribute pair consisting of attribute 1max and an attribute of schema B is greater than SS(1max,2max);

(ii) No similarity score of any other attribute pair consisting of attribute 2max and an attribute of schema A is greater than SS(1max,2max);

(iii) No similarity score of any other attribute pair consisting of attribute 1max and an attribute of schema B is greater than [SS(1max,2max)−T]; and (iv) No similarity score of any other attribute pair consisting of attribute 2max and an attribute of schema A is greater than [SS(1max,2max)−T].

In the example of Table 4, SS(1-1,2-2)=0.9 is the confident mapping, even though SS(1-1,2-2) is not the highest similarity score in the Table 4 matrix. Given a threshold value TH of 0.2, this mapping satisfies all four conditions:

(i) No similarity score of any other attribute pair consisting of attribute 1-1 and an attribute of schema B is greater than 0.9;

(ii) No similarity score of any other attribute pair consisting of attribute 2-2 and an attribute of schema A is greater than 0.9;

(iii) No similarity score of any other attribute pair consisting of attribute 1-1 and an attribute of schema B is greater than [0.9-0.2]; and (iv) No similarity score of any other attribute pair consisting of attribute 2-2 and an attribute of schema A is greater than [0.9-0.2].

Although SS(1-2,2-1)=0.95 is larger than SS(1-1,2-2)=0.9, this fact is not sufficient to automatically make SS(1-2,2-1) the confident mapping. Although SS(1-2,2-1) satisfies conditions (i) and (ii), it does not satisfy conditions (iii) and (iv):

(iii) Similarity score SS(1-2,2-3)=0.94, which is greater than [0.95-0.2]; and (iv) Similarity score SS(1-4,2-1)=0.76, which is greater than [0.95-0.2]

The search engine in this step identifies a confident mapping for each similarity matrix derived in step 340. If two or more mappings satisfy all four conditions for a particular matrix, an implementer may arbitrarily choose any of the satisfying mappings, which would all be equally likely to provide accurate results.

In step 360, the search engine uses the confident mappings selected in step 350 to select pairs of similar records from the set of records retrieved in step 200. For example, if the search engine had determined that SS(1-1,2-2) is the confident mapping between schema A and schema B, then the search engine would attempt to match records by comparing each schema A record's stored value of attribute 1-1 with each schema B record's stored value of attribute 2-2.

In this example, if a schema A record comprises an attribute 1-1 value that is identical (or, if desired by an implementer, that is very close) to a corresponding value of attribute 2-2 of a the schema B record, then the search engine would assume that the two records are likely to describe an identical or similar entity. In some embodiments, the search engine might also assume that each unconfident attribute pair of the same two schemas also describes equivalent characteristics of an identical or similar entity.

At the conclusion of step 360, the search engine will have used the confident mappings selected in step 350 to select sets of matching-record pairs from the data records retrieved in step 200. Each set will contain pairs that each consists of one record formatted in compliance with a first source schema associated with that set and a second record formatted in compliance with a second source schema associated with that set. The two records of any pair of records in a particular set will contain identical or very similar values of the two attributes of the confident mapping associated with the two source schemas of that set.

In step 360, the search engine adjusts each similarity score derived in step 340 as functions of the search for similar records performed in step 350.

The search engine begins step 360 for each schema pair by selecting a certain number, or sampling size SZ, of pairs of records from a set of matching records. For example, if the search engine in step 350 found a set of 5000 pairs of matching records, where a first record of each pair conforms to schema A and a second record of the same pair conforms to schema B, the search engine may consider all 5000 pairs in this set, yielding a sample size SZ=5000, or may consider smaller representative sample sizes, if an implementer wishes to increase the efficiency of an implementation.

In an example based on the matrix of Table 4, a set of 1000 matching records may have been selected from imported records that conform to either schema 1, which comprises n attributes {1-1, 1-2, 1-3, . . . , 1-n} or schema 2, which comprises m attributes {2-1, 2-2, 2-3, . . . , 2-m}. Here, the confident mapping of schema 1 onto schema 2 is SS(1-1,2-2), which is a mapping between schema 1 attribute 1-1 and schema 2 attribute 2-2. The sample size SZ is chosen to be all 1000 pairs, although an implementer may, if desired, choose a smaller size in order to improve performance. Each of the 1000 matching records contains one record that conforms to schema 1 and has a particular value of attribute 1-1 and a second record that conforms to schema 2 and that has an identical or nearly identical value of attribute 2-2.

The search engine then compares every other attribute pair of every other pair of matching records. For example, it would compare, in every pair of matching records, the value of attribute 1-1 in a first record of the pair to the value of attribute 2-1 in the second record of the pair. It would then compare, in every pair of matching records, the value of attribute 1-2 in the first record of each pair to the value of attribute 2-1 in the second record of that pair, and would continue until all possible attribute pairs (other than the confident-mapping pair) had been compared in all 1000 records of the sample.

The search engine would then, for each compared attribute pair, count the number of pairs that matched. For example, if 250 pairs comprised identical values of attribute 1-1 and attribute 2-3, the search engine would record a count CNT(1-1,2-3)=250. At the conclusion of this procedure, the search engine will have derived a CNT value for every possible non-confident mapping of every possible pair of schemas.

The search engine then adjusts each similarity score SS derived in step 340 as a function of these CNT value, according to Equation (5):

$$SS(Ai,Bj)=SS(Ai,Bj)*[CNT(Ai,Bj)/SZ] \quad (5)$$

where Ai is an attribute of schema 1 and Bj is an attribute of schema 2. In our running example, each of the (n*m)−1 nonconfident mappings of matrix Table 4 would be adjusted by the CNT value of that mapping divided the sample size SZ. In other words, each attribute pair's similarity score is pro-rated by the percent of matching data records that comprise matching values of that attribute pair.

In the example of Table 4, SS(1-4,2-1)=0.76. If the search engine in step 360 identified 1000 matching records, and if attributes 1-4 and 2-2 contained identical values in 200 of those 1000 matching pairs, then the similarity score of attribute pair (1-4, 2-1) would be adjusted by Equation 5:

$$SS(1\text{-}4,2\text{-}1)=SS(1\text{-}4,2\text{-}1)*[CNT(1\text{-}4,2\text{-}1)/SZ]$$

$$SS(1\text{-}4,2\text{-}1)=0.76*[200/1000]$$

$$SS(1\text{-}4,2\text{-}1)=0.152$$

The search engine would adjust every nonconfident mapping in the schema 1/schema 2 matrix of Table 4 in a similar manner. The search engine would further adjust similarity scores of every other two-schema matrix in the same way.

At the conclusion of step 370, the search engine will have generated a set of matrices of adjusted similarity scores. Each matrix represents similarities between one possible pair of source schemas of the data items imported in step 200. Each entry in a matrix for two particular schemas identifies the relative degree of similarity between one attribute of one of the two particular schemas and one attribute of the other of the two particular schemas. One of those entries will identify a confident mapping for the two particular schemas, which will be used by the search engine to identify matching pairs of records, where each pair consists of one record formatted to conform to each of the two schemas.

The similarity scores of these mappings may in some embodiments be plotted by means known in the art as points in a multi-dimensional attribute-similarity space, where each axis of the space identifies a degree of similarity between a pair of attributes.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A search-engine system comprising a processor, a memory coupled to the processor, and a computer-readable hardware storage device coupled to the processor, the storage device containing program code configured to be run by the processor via the memory to implement a method for a search engine with automated similarity-based clustering, the method comprising:
  the search engine retrieving a plurality of records from one or more external sources,
    where each record of the plurality of records stores data in one or more attribute fields, and
    where each record's attribute fields are specified by a corresponding schema of a set of source schemas;
  the search engine deriving a matrix of attribute mappings,
    where each mapping of the matrix identifies rules for translating a value of an attribute of a first schema of the set of source schemas into a value of an attribute of a distinct second schema of the set of source schemas, and
    where each mapping of the matrix is associated with a corresponding similarity score that identifies a relative degree of similarity between attributes mapped by the each mapping;
  the search engine receiving a search request;
  the search engine inferring, from the search request, values of a primary subset of attributes of the first schema;
  the search engine using at least one of the matrix of attribute mappings to translate the values of the primary subset into values of a secondary subset of attributes of the second schema;
  the search engine selecting a results subset of the plurality of records,
    where each record of the results subset is formatted in accordance with the second schema, and
    where each record of the results subset is selected with search criteria consisting of the values of the secondary subset of attributes; and
  the search engine returning the results subset in response to the search request.

2. The search engine of claim 1, where the primary subset is selected by comparing similarity scores associated with all mappings of the matrix.

3. The search engine of claim 1, further comprising:
  the search engine assigning a match score to each selected record of the results subset, where a first match score of a first selected record of the results subset identifies a relative degree to which the first selected record matches the search criteria; and
  the search engine adjusting each match score by assigning a weighting to each match score, where the weighting is equal to an average of all similarity scores associated with mappings used to select the secondary subset.

4. The search engine of claim 3, where the search engine returns records of the results subset in an order dictated by the match score of each returned record after any making any match-score adjustments.

5. The search engine of claim 1, further comprising:
  the search engine selecting a first-schema results subset of the plurality of records,
    where each record of the first-schema results subset is formatted in accordance with the first schema, and
    where each record of the first-schema results subset is with primary search criteria consisting of the inferred values of the primary subset of attributes;
  the search engine assigning a match score to each record of the first-schema results subset, where each match score identifies a relative degree to which a record of the first-schema results subset satisfies the primary search criteria; and
  the search engine adding the first-schema results subset to the results subset before returning the results subset in response to the search request.

6. The search engine of claim 1,
  where a first mapping of the matrix of attribute mappings defines a mapping between a first attribute of the first schema and a second attribute of the second schema,
  where a similarity score of the first mapping is proportional to:
    a relative degree of similarity between a name of the first attribute and a name of the second attribute,
    a relative degree of similarity between a first category of information represented by the first attribute and a second category of information represented by the second attribute, a relative degree of similarity between a first storage format of the first attribute and a second storage format of the second attribute, and at least one data-similarity measurement that measures relative similarity between a first distribution of first-attribute values stored in the plurality of records and a second distribution of second-attribute values stored in the plurality of records, where the at least one data-similarity measurements are derived by functions selected from the group consisting of: a Chi-Square function, a Kullback-Leibler divergence function, a TF-IDF (Term Frequency, Inverse Document Frequency) derivation, a semantic analytics operation, and an alphanumeric-string pattern-matching function.

7. The search engine of claim 1, further comprising:
the search engine selecting a confident mapping from the matrix of attribute mappings, such that:
the confident mapping identifies rules for translating a value of a first confident attribute of the first schema into a value of an attribute of a second confident attribute of the second schema,
no similarity score of the first confident attribute and an attribute of the second schema is greater than a similarity score of the confident mapping within a tolerance of a predefined threshold value, and
no similarity score of the second confident attribute and an attribute of the first schema is greater than the similarity score of the confident mapping within the tolerance of the predefined threshold value;
the search engine selecting a matching subset of the plurality of records,
where the matching subset consists of pairs of records,
where each pair of records consists of a first matching record that conforms to the first schema and a second matching record that conforms to the second schema, and
where a value of the first confident attribute in the first matching record matches a value of the second confident attribute in the second matching record; and
the search engine adjusting each similarity score of the matrix of attribute mappings by multiplying the each similarity score by a number of records comprised by the matching subset divided by a total number of records comprised by the plurality of records.

8. A method for a search engine with automated similarity-based clustering, the method comprising:
retrieving, by the search engine, a plurality of records from one or more external sources,
where each record of the plurality of records stores data in one or more attribute fields, and
where each record's attribute fields are specified by a corresponding schema of a set of source schemas;
the search engine deriving a matrix of attribute mappings,
where each mapping of the matrix identifies rules for translating a value of an attribute of a first schema of the set of source schemas into a value of an attribute of a distinct second schema of the set of source schemas, and
where each mapping of the matrix is associated with a corresponding similarity score that identifies a relative degree of similarity between attributes mapped by the each mapping;
receiving, by the search engine, a search request;

inferring from the search request, by the search engine, values of a primary subset of attributes of the first schema;
using, by the search engine, at least one of the matrix of attribute mappings to translate the values of the primary subset into values of a secondary subset of attributes of the second schema;
the search engine selecting a results subset of the plurality of records,
where each record of the results subset is formatted in accordance with the second schema, and
where each record of the results subset is selected with search criteria consisting of the values of the secondary subset of attributes; and
returning, by the search engine, the results subset in response to the search request.

9. The method of claim 8, where the primary subset is selected by comparing similarity scores associated with all mappings of the matrix.

10. The method of claim 8, further comprising:
assigning, by the search engine, a match score to each selected record of the results subset, where a first match score of a first selected record of the results subset identifies a relative degree to which the first selected record matches the search criteria; and
adjusting, by the search engine, each match score by assigning a weighting to each match score, where the weighting is equal to an average of all similarity scores associated with mappings used to select the secondary subset, where the search engine returns records of the results subset in an order dictated by the match score of each returned record after any making any match-score adjustments.

11. The method of claim 8, further comprising:
selecting, by the search engine, a first-schema results subset of the plurality of records,
where each record of the first-schema results subset is formatted in accordance with the first schema, and
where each record of the first-schema results subset is with primary search criteria consisting of the inferred values of the primary subset of attributes;
assigning, by the search engine, a match score to each record of the first-schema results subset, where each match score identifies a relative degree to which a record of the first-schema results subset satisfies the primary search criteria; and
adding, by the search engine, the first-schema results subset to the results subset before returning the results subset in response to the search request.

12. The method of claim 8,
where a first mapping of the matrix of attribute mappings defines a mapping between a first attribute of the first schema and a second attribute of the second schema,
where a similarity score of the first mapping is proportional to:
a relative degree of similarity between a name of the first attribute and a name of the second attribute,
a relative degree of similarity between a first category of information represented by the first attribute and a second category of information represented by the second attribute,
a relative degree of similarity between a first storage format of the first attribute and a second storage format of the second attribute, and
at least one data-similarity measurement that measures relative similarity between a first distribution of first-attribute values stored in the plurality of records and a second distribution of second-attribute values stored in the plurality of records, where the at least one data-similarity measurements are derived by functions selected from the group consisting of: a Chi-Square function, a Kullback-Leibler divergence function, a TF-IDF (Term Frequency, Inverse Document Frequency) derivation, a semantic analytics operation, and an alphanumeric-string pattern-matching function.

13. The method of claim 8, further comprising:
   selecting, by the search engine, a confident mapping from the matrix of attribute mappings, such that:
      the confident mapping identifies rules for translating a value of a first confident attribute of the first schema into a value of an attribute of a second confident attribute of the second schema,
      no similarity score of the first confident attribute and an attribute of the second schema is greater than a similarity score of the confident mapping within a tolerance of a predefined threshold value, and
      no similarity score of the second confident attribute and an attribute of the first schema is greater than the similarity score of the confident mapping within the tolerance of the predefined threshold value;
   the search engine selecting a matching subset of the plurality of records,
      where the matching subset consists of pairs of records,
      where each pair of records consists of a first matching record that conforms to the first schema and a second matching record that conforms to the second schema, and
      where a value of the first confident attribute in the first matching record matches a value of the second confident attribute in the second matching record; and
   adjusting, by the search engine, each similarity score of the matrix of attribute mappings by multiplying the each similarity score by a number of records comprised by the matching subset divided by a total number of records comprised by the plurality of records.

14. The method of claim 8, further comprising providing at least one support service for at least one of creating, integrating, hosting, maintaining, and deploying computer-readable program code in the computer system, wherein the computer-readable program code in combination with the computer system is configured to implement the retrieving, the receiving, the inferring, the using and the returning.

15. A computer program product, comprising a computer-readable hardware storage device having a computer-readable program code stored therein, the program code configured to be executed by a computerized search-engine system comprising a processor, a memory coupled to the processor, and a computer-readable hardware storage device coupled to the processor, the storage device containing program code configured to be run by the processor via the memory to implement a method for a search engine with automated similarity-based clustering, the method comprising:
   the search engine retrieving a plurality of records from one or more external sources,
      where each record of the plurality of records stores data in one or more attribute fields, and
      where each record's attribute fields are specified by a corresponding schema of a set of source schemas;
   the search engine deriving a matrix of attribute mappings, where each mapping of the matrix identifies rules for translating a value of an attribute of a first schema of the set of source schemas into a value of an attribute of a distinct second schema of the set of source schemas, and
      where each mapping of the matrix is associated with a corresponding similarity score that identifies a relative degree of similarity between attributes mapped by the each mapping;
   the search engine receiving a search request;
   the search engine inferring, from the search request, values of a primary subset of attributes of the first schema;
   the search engine using at least one of the matrix of attribute mappings to translate the values of the primary subset into values of a secondary subset of attributes of the second schema;
   the search engine selecting a results subset of the plurality of records,
      where each record of the results subset is formatted in accordance with the second schema, and
      where each record of the results subset is selected with search criteria consisting of the values of the secondary subset of attributes; and
   the search engine returning the results subset in response to the search request.

16. The computer program product of claim 15, where the primary subset is selected by comparing similarity scores associated with all mappings of the matrix.

17. The computer program product of claim 15, further comprising:
   the search engine assigning a match score to each selected record of the results subset, where a first match score of a first selected record of the results subset identifies a relative degree to which the first selected record matches the search criteria;
   the search engine adjusting each match score by assigning a weighting to each match score, where the weighting is equal to an average of all similarity scores associated with mappings used to select the secondary subset, where the search engine returns records of the results subset in an order dictated by the match score of each returned record after any making any match-score adjustments.

18. The computer program product of claim 15, further comprising:
   the search engine selecting a first-schema results subset of the plurality of records,
      where each record of the first-schema results subset is formatted in accordance with the first schema, and
      where each record of the first-schema results subset is with primary search criteria consisting of the inferred values of the primary subset of attributes;
   the search engine assigning a match score to each record of the first-schema results subset, where each match score identifies a relative degree to which a record of the first-schema results subset satisfies the primary search criteria; and
   the search engine adding the first-schema results subset to the results subset before returning the results subset in response to the search request.

19. The computer program product of claim 15,
   where a first mapping of the matrix of attribute mappings defines a mapping between a first attribute of the first schema and a second attribute of the second schema,
   where a similarity score of the first mapping is proportional to:
      a relative degree of similarity between a name of the first attribute and a name of the second attribute, a relative degree of similarity between a first category of information represented by the first attribute and a second category of information represented by the second attribute, a relative degree of similarity between a first storage format of the first attribute and a second storage format of the second attribute, and at least one data-similarity measurement that measures relative similarity between a first distribution of first-attribute values stored in the plurality of records and a second distribution of second-attribute values stored in the plurality of records, where the at least one data-similarity measurements are derived by functions selected from the group consisting of: a Chi-Square function, a Kullback-Leibler divergence function, a TF-IDF (Term Frequency, Inverse Document Frequency) derivation, a semantic analytics operation, and an alphanumeric-string pattern-matching function.

20. The computer program product of claim 15, further comprising:

the search engine selecting a confident mapping from the matrix of attribute mappings, such that:

the confident mapping identifies rules for translating a value of a first confident attribute of the first schema into a value of an attribute of a second confident attribute of the second schema, no similarity score of the first confident attribute and an attribute of the second schema is greater than a similarity score of the confident mapping within a tolerance of a predefined threshold value, and no similarity score of the second confident attribute and an attribute of the first schema is greater than the similarity score of the confident mapping within the tolerance of the predefined threshold value;

the search engine selecting a matching subset of the plurality of records, where the matching subset consists of pairs of records, where each pair of records consists of a first matching record that conforms to the first schema and a second matching record that conforms to the second schema, and where a value of the first confident attribute in the first matching record matches a value of the second confident attribute in the second matching record; and the search engine adjusting each similarity score of the matrix of attribute mappings by multiplying the each similarity score by a number of records comprised by the matching subset divided by a total number of records comprised by the plurality of records.

* * * * *